Patented Apr. 21, 1925.

1,534,512

UNITED STATES PATENT OFFICE.

HERMANN FRITZSCHE AND EMIL REBER, OF BASEL, SWITZERLAND, ASSIGNORS TO SOCIETY OF CHEMICAL INDUSTRY IN BASLE, OF BASEL, SWITZERLAND.

1-ARYL-5-PYRAZOLONES AND PROCESS OF MAKING SAME.

No Drawing.    Application filed October 8, 1923.    Serial No. 667,406.

*To all whom it may concern:*

Be it known that we, HERMANN FRITZSCHE and EMIL REBER, both citizens of the Swiss Republic, and residing at Basel, Switzerland, have invented new and useful 1-Aryl-5-Pyrazolones and Processes of Making Same, of which the following is a full, clear, and exact specification.

The present invention relates to new pyrazolones which are valuable intermediate products for the manufacture of dyestuffs. It comprises the process of manufacture of the new pyrazolones, as well as the pyrazolones themselves.

The new pyrazolones are made by converting by diazotization and reduction an amide of a sulfonic acid of a primary aromatic amine into the corresponding hydrazine and condensing the latter with the appropriate derivative of a ketonic acid. As such there are particularly suitable the acetoacetic ester and the oxalacetic ester.

There are thus obtained new 1-aryl-5-pyrazolones which carry an $SO_2NH_2$ group in their aryl nucleus. These new pyrazolones constitute colorless to almost colorless powders having melting points more or less sharp. They dissolve easily in aqueous solutions of caustic alkalies. They form valuable intermediate products for the production of dyestuffs.

The following examples illustrate the invention without, however, limiting the same.

Example 1.

17.2 parts of 3-aminobenzene-1-sulfamide are dissolved in 25 parts of boiling water. 28 parts of concentrated hydrochloric acid are added, the mixture is cooled to 0° C. by adding ice and then diazotized with 7 parts of sodium nitrite. The diazo solution thus obtained is poured into a solution of sodium sulfite previously cooled to 10° C. made from 25 parts of sodium bisulfite and 20 parts of caustic soda. There is thus obtained a yellow liquid which rapidly loses its color; it is evaporated until it begins to crystallize, whereupon 20 parts of concentrated hydrochloric acid are added, the sulfurous acid is expelled and the mixture cooled to obtain a good yield of the desired hydrazine.

If condensation with acetoacetic ester is contemplated, it is not necessary to isolate the hydrazine; the solution, from which sulfurous acid has been eliminated and which has been cooled, may be neutralized with sodium carbonate until it turns red Congo paper blue only very feebly, then diluted to 150–200 parts and mixed with 13 parts of acetoacetic ester added in small doses. The metasulfamidophenylhydrazone of acetoacetic ester separates at first in a slightly oily form and then rapidly becomes crystalline. It is re-dissolved by adding 26 parts of a concentrated solution of caustic soda and the liquid, the color of which is a slightly brownish-yellow, is heated at 60° C. to transform the hydrazone into 1-(3'-sulfamido)-phenyl-3-methyl-5-pyrazolone. By adding 23 parts of concentrated hydrochloric acid until the reaction is very feebly acid the new product is precipitated in the form of clots which rapidly harden. To purify it completely it is re-crystallized from a suitable liquid, for instance from much hot water, diluted acetic acid, nitrobenzene or the like. It then has the form of slightly yellowish crystals melting at 199° C. It is little soluble in cold water, alcohol, dilute acetic acid, nitrobenzene, but dissolves easily in hot water or hot alcohol. Also in hot acetic acid and hot nitrobenzene as well as in aqueous solutions of fixed caustic alkalies and mineral acids.

By similar treatments of 3-aminobenzene-4-methyl-1-sulfamide there is obtained 1-(3'-sulfamido-6'-methyl)-phenyl-3-methyl-5-pyrazolone, melting at 106–108° C.; 3-aminobenzene-4-chloro-1-sulfamide yields 1-(3'-sulfamido-6'-chloro)-phenyl-3-methyl-5-pyrazolone, which melts at 163° C.; 4-aminobenzene-1-sulfamide yields 1-(4' sulfamido)-phenyl-3-methyl-5-pyrazolone melting at about 244–245° C.

Example 2.

From 20.7 parts of 3-aminobenzene-4-methyl-1-sulfamide, the corresponding hydrazine is prepared by the method indicated in Example 1: it is precipitated in very good yield when the solution from which the sulfurous acid has been expelled is allowed to cool. After filtration it is dissolved in a suitable solvent, for instance in 150 parts of alcohol, and to the solution 16–18 parts of oxal-acetic ester are added while the liquid is kept very feebly acid to red Congo paper. 150 parts of water are added and, little by little at ordinary temperature, caustic soda, until the reaction is strongly alkaline; the alcohol is distilled and 1-(3'-sulfamido-6'-methyl)-phenyl-5-pyrazolone-3-carboxylic acid is precipitated. The new pyrazolone may be purified by crystallization from hot water; it then forms nearly colorless crystals melting at 169° while effervescing. After solidification it melts at about 225° C. with decomposition. When crystallized from glacial acetic acid it is obtained from the first in a form melting at about 225° C. The compound is but little soluble in cold water, more soluble in hot water; it also dissolves with difficulty in cold glacial acetic acid but easily in the hot acid and in aqueous solutions of fixed caustic alkali.

A similar result is obtained when the condensation of the hydrazine and oxaloacetic ester is conducted in an aqueous medium.

By treating analogously 3-aminobenzene-1-sulfamide there is obtianed 1-(3'-sulfamido)-phenyl-5-pyrazolone-3-carboxylic acid, which when crystallized from water melts above 250° C. with decomposition; 3-aminobenzene-4-chloro-1-sulfamide yields 1-(3'-sulfamido-6'-chloro)-phenyl-5-pyrazolone-3-carboxylic acid which melts when crystallized from water above 170° C. with decomposition; 4-aminobenzene-1-sulfamide yields 1-(4'-sulfamido)-phenyl-5-pyrazolone-3-carboxylic acid, which when crystallized from water melts above 260° C. with decomposition.

What we claim is:

1. As new products the herein described new 1-aryl-5-pyrazolones carrying an $SO_2NH_2$ group in their aryl nucleus and forming colorless to slightly colored powders which dissolve easily in aqueous solutions of caustic alkalies.

2. As new products the herein described new 1-aryl-3-methyl-5-pyrazolones carrying an $SO_2NH_2$ group in their aryl nucleus and forming colorless to slightly colored powders which dissolve easily in aqueous solutions of caustic alkalies.

3. As new products the herein described new 1-(3'-sulfamido)-aryl-3-methyl-5-pyrazolones forming colorless to slightly colored powders which dissolve easily in aqueous solutions of caustic alkalies.

4. As a new product the herein described new 1-(3'-sulfamido)-phenyl-3-methyl-5-pyrazolone forming a slightly yellow powder melting at 199° C. which dissolves easily in aqueous solutions of caustic alkalies.

In witness whereof we have hereunto signed our names, this 27th day of September, 1923, in the presence of two subscribing witnesses.

HERMANN FRITZSCHE.
EMIL REBER.

Witnesses:
 AMAND BRAUN,
 JOSEPH SÜTTERLIN.